No. 730,313. PATENTED JUNE 9, 1903.
F. J. STRATTON.
MECHANISM FOR OPERATING MOLDING MACHINES.
APPLICATION FILED FEB. 24, 1903.
NO MODEL. 3 SHEETS—SHEET 1.
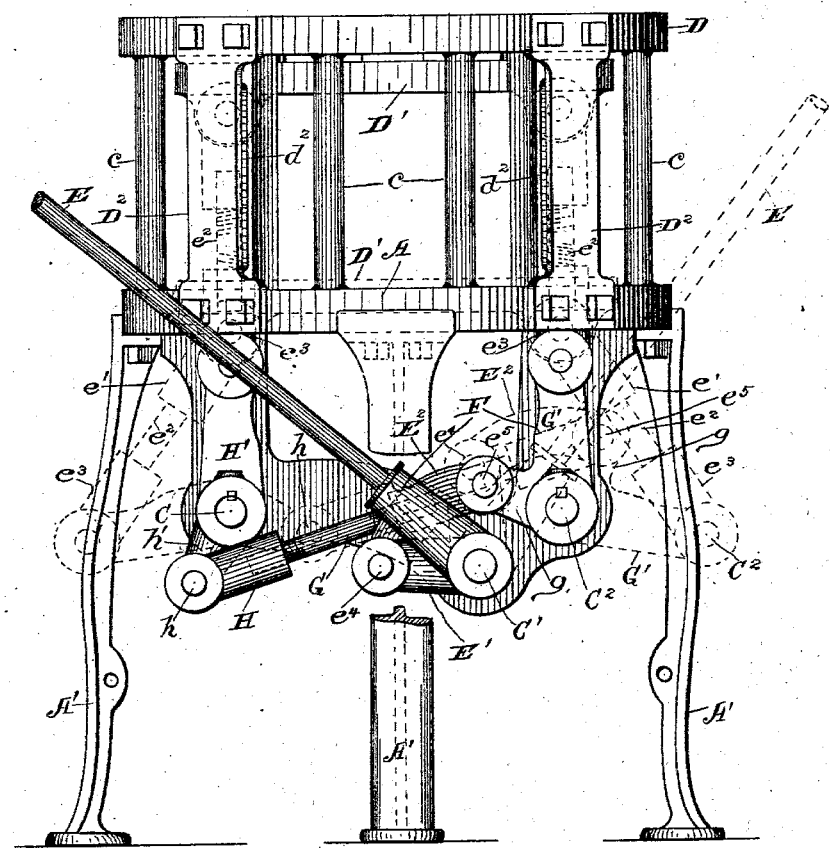

No. 730,313. PATENTED JUNE 9, 1903.
F. J. STRATTON.
MECHANISM FOR OPERATING MOLDING MACHINES.
APPLICATION FILED FEB. 24, 1903.

NO MODEL. 3 SHEETS—SHEET 2.

No. 730,313. PATENTED JUNE 9, 1903.
F. J. STRATTON.
MECHANISM FOR OPERATING MOLDING MACHINES.
APPLICATION FILED FEB. 24, 1903.
NO MODEL. 3 SHEETS—SHEET 3.

Witnesses:
Chas E Gorton
A. Gustafson

Inventor:
Frank J. Stratton
By Chas. C. Tillman
Atty.

No. 730,313.

Patented June 9, 1903.

UNITED STATES PATENT OFFICE.

FRANK J. STRATTON, OF LAGRANGE, ILLINOIS, ASSIGNOR TO OREGON FOUNDRY AND MACHINE COMPANY, OF OREGON, ILLINOIS, A CORPORATION OF ILLINOIS.

MECHANISM FOR OPERATING MOLDING-MACHINES.

SPECIFICATION forming part of Letters Patent No. 730,313, dated June 9, 1903.

Application filed February 24, 1903. Serial No. 144,661. (No model.)

*To all whom it may concern:*

Be it known that I, FRANK J. STRATTON, a citizen of the United States, residing at Lagrange, in the county of Cook and State of Illinois, have invented certain new and useful Improvements in Mechanism for Operating Molding-Machines, of which the following is a specification.

This invention relates to improvements in molding-machines, and has for its principal object to furnish a simple and inexpensive mechanism for easily and accurately lowering and raising the pattern-frame and has some of the elements shown and described in application, Serial No. 35,728, filed by me on the 7th day of November, 1900.

My present invention consists in novel features of construction and combination of parts whereby the above object, as well as others hereinafter named, are accomplished, as will be fully described, and particularly pointed out in claims.

In order to enable others skilled in the art to which my invention pertains to make and use the same, I will now proceed to describe it, referring to the accompanying drawings, in which—

Figure 2:
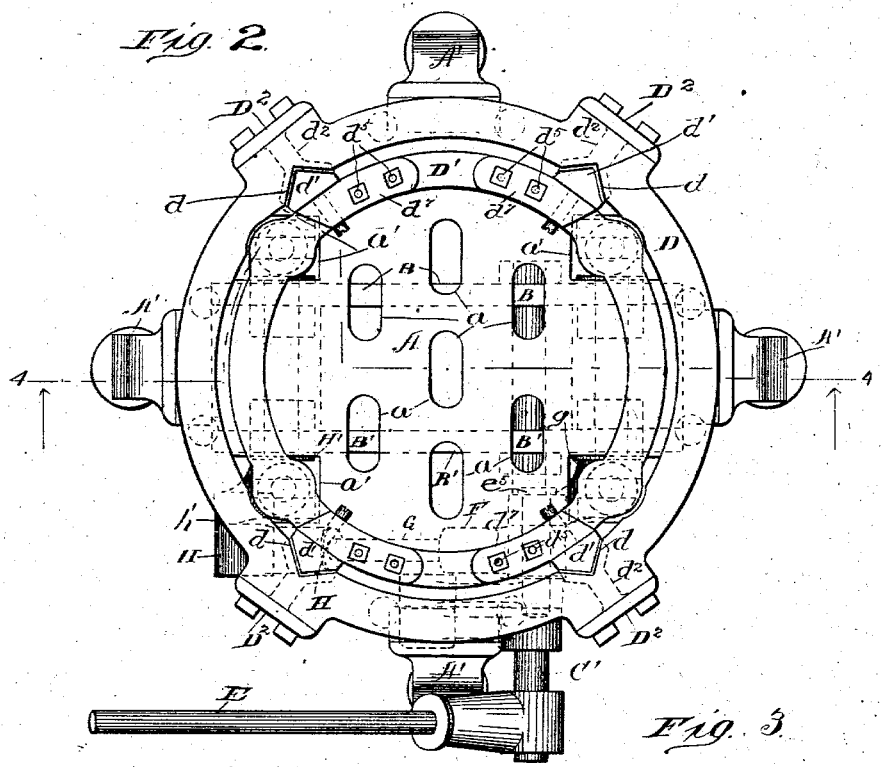
Figure 3:
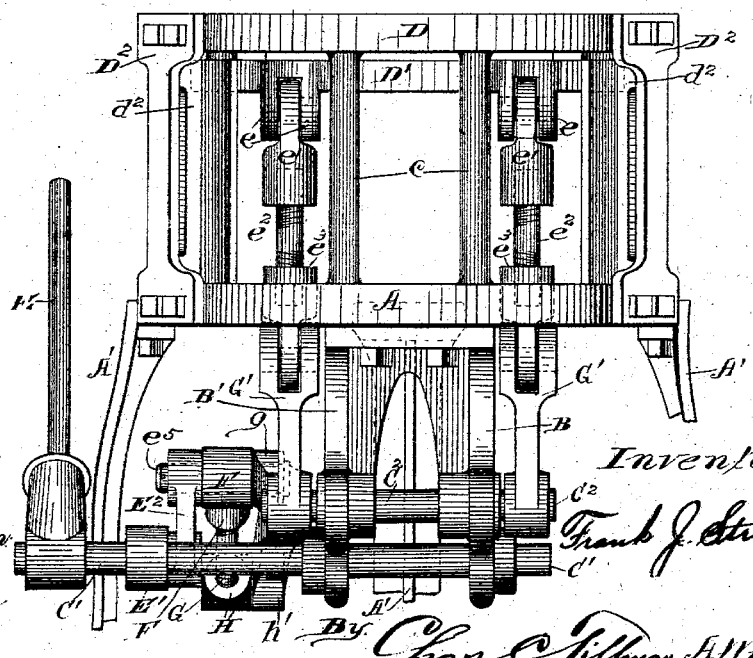
Figure 4:
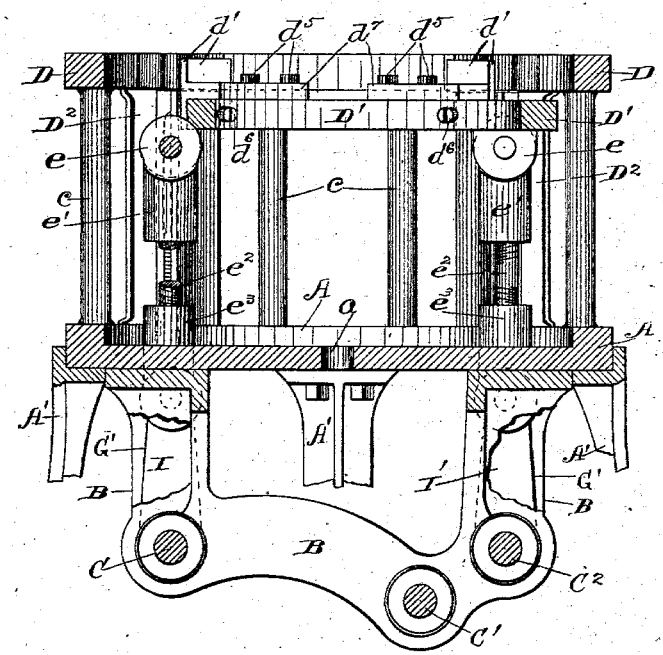
Figure 5:
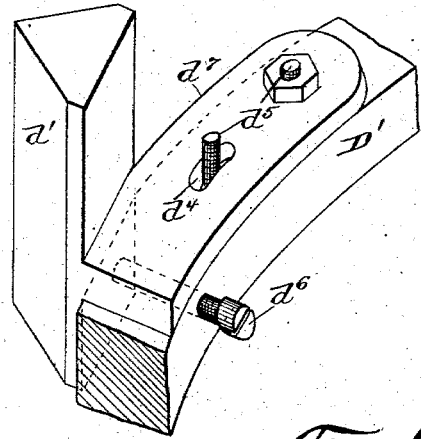

Figure 1 is a view in side elevation of a machine embodying my invention, showing by broken lines the position of the parts when the pattern-frame is lowered. Fig. 2 is a plan view. Fig. 3 is an end view in elevation. Fig. 4 is a sectional view taken on line 4 4 of Fig. 2 looking in the direction indicated by the arrows. Fig. 5 is a detached perspective view of a portion of the pattern-carrying frame or yoke and one of its adjustable guides, and Fig. 6 is a perspective view of one of the guide-bars detached.

Similar letters refer to like parts throughout the different views of the drawings.

A represents the bed-plate, which in the present instance is shown as being circular, but which may be of any suitable shape and is provided with a series of openings $a$ and $a'$, the former to permit of the passage of sand and the latter for the operation of the adjustable supporting-rods for the pattern-carrying frame. The plate A is supported by means of legs A' and has secured to its lower surface hangers B and B', in which are journaled the shafts C, C', and $C^2$, the shaft C' extending some distance through the hanger B, as is clearly shown in Figs. 2 and 3 of the drawings. Supported on suitable uprights $c$, extending from the plate A upwardly, is the stripper-plate D, on which the flasks or mold-boxes (not shown) rest. The inner surface of the stripper-plate D is provided with a number of angular or V-shaped recesses $d$ for the reception and operation of the correspondingly-shaped guides $d'$, which are carried by the pattern-carrying frame or yoke D', which is of a shape to correspond with the shape of the stripper-plate D and is located therein. Secured to the outer surfaces of the plates A and D at points opposite the recesses $d$ in the stripper-plate are bars $D^2$, each of which has on its inner surface a rib $d^2$, provided with a vertical angular recess $d^3$ for the reception and operation of the guides $d'$ on the yoke or pattern-frame. Each of the guides $d'$ comprises an upright portion triangular in cross-section and has on its inner surface a horizontally-extending bracket $d^7$, which is provided with elongated openings $d^4$ for the reception of bolts $d^5$, located in the yoke D' and employed for securing the guides thereon. Passing through the yoke D' at points opposite the inner surface of each of the guides $d'$ are adjusting-screws $d^6$, by means of which the guides may be moved, so as to cause them to fit the grooves or recesses $d$ and $d^3$ snugly. The lower surface of the pattern-frame or yoke D' is provided with a number of lugs $e$, which are arranged in pairs, as shown in Fig. 3 of the drawings, and have pivotally secured between them screw-threaded socket-pieces $e'$, which receive one end of the adjusting-rods $e^2$, which rods are provided with right-and-left screw-threads and the other ends of which engage socket-pieces $e^3$, which are pivotally connected at their lower ends to other parts, as will be presently explained. Fixed on the shaft C' near one of its ends is a hand-lever E, used for rocking said shaft when it is desired to raise and lower the pattern-frame or yoke. Rigidly secured to the shaft C' near the lever E is an arm E', which has secured thereto, by means of a pivot $e^4$, a segment-link $E^2$, the other end of which is pivoted on a pin or shaft $e^5$, on which is also pivotally secured an arm F, which is connected, by means of a connecting-rod G, to one end of an arm H, the other end of which is secured, by means of a pivot $h$, to the shorter arm $h'$ of the lever H', which is fulcrumed on the shaft C. Fulcrumed on the shaft $C^2$ is a bell-crank lever G', the shorter arm $g$ of which is pivotally secured on the pin or shaft $e^5$, which connects the link $E^2$ and arm F. The longer arm of the bell-crank lever G' is pivotally secured to one of the socket-pieces $e^3$, which extends through the openings $a'$ in the bed-plate. The longer arm of the lever H' is pivotally connected to one of the socket-pieces $e^3$, as is clearly shown in Fig. 1 of the drawings. On the opposite end of the shaft C from that on which the lever H' is located is fixed an arm I, which is pivotally connected at its other end to one of the socket-pieces $e^3$, (see Fig. 4,) and on the opposite end of the shaft $C^2$ from that on which the bell-crank lever G' is located is fixed an arm I', the other end of which is pivotally secured to one of the socket-pieces $e^3$, which socketed pieces and the rods $e^2$, engaging therewith, are employed for adjusting the position of the pattern-frame or yoke, which can be done by turning the rods $e^2$ in the proper direction to raise or lower said frame. While I have shown the guides $d'$ located so as to extend above the movable yoke or frame D', yet it is apparent that by simply reversing them they may be secured to the lower surface thereof.

By throwing the hand-lever E to the position shown by dotted lines in Fig. 1 of the drawings it is evident that the movable frame or yoke D', through its connections with the power-shaft C', on which the said lever is fixed, will be lowered, thus withdrawing the patterns from the flasks or mold-boxes.

Having thus fully described my invention, what I claim as new, and desire to secure by Letters Patent, is—

1. The combination with the supporting-frame, of a power-shaft C', and two other shafts C, and $C^2$, journaled thereon, a movable frame within the supporting-frame, a hand-lever fixed on the power-shaft, a lever fulcrumed on the shaft C, and having a long and short arm, a rod pivotally connecting the said longer arm and movable frame, an arm I, fixed on the shaft C, near its other end and pivotally connected to the movable frame, a bell-crank lever fulcrumed on the shaft $C^2$, and pivotally connected by its longer arm to the movable frame, connections uniting the shorter arm of the bell-crank lever to the shorter arm of the lever on the shaft C and to the power-shaft respectively, and an arm I', fixed at one of its ends to the shaft $C^2$, and pivotally connected at its other end to the movable frame, substantially as described.

2. The combination with the supporting-frame having vertical grooves or guideways, of a power-shaft C', and two other shafts C, and $C^2$, journaled thereon, a movable frame located within the supporting-frame, guides adjustably secured to the movable frame, a hand-lever fixed on the power-shaft, a lever fulcrumed on the shaft C, and having a long and short arm, a rod pivotally connecting the said longer arm and movable frame, an arm I, fixed on the shaft C, near its other end and pivotally connected to the movable frame, a bell-crank lever fulcrumed on the shaft $C^2$, and pivotally connected by its longer arm to the movable frame, connections uniting the shorter arm of the bell-crank lever to the shorter arm of the lever on the shaft C and to the power-shaft respectively, and an arm I', fixed at one of its ends to the shaft $C^2$, and pivotally connected at its other end to the movable frame, substantially as described.

FRANK J. STRATTON.

Witnesses:
CHAS. C. TILLMAN,
A. GUSTAFSON.